(12) United States Patent
Lai

(10) Patent No.: US 7,388,546 B2
(45) Date of Patent: Jun. 17, 2008

(54) DOUBLE AXIAL ANTENNA STRUCTURE OF PORTABLE ELECTRONIC DEVICE

(75) Inventor: Chun-Ping Lai, Taipei (TW)

(73) Assignee: Mitac International Corp., Taoyuan (TW)

( * ) Notice: Subject to any disclaimer, the term of this patent is extended or adjusted under 35 U.S.C. 154(b) by 63 days.

(21) Appl. No.: 11/441,256

(22) Filed: May 26, 2006

(65) Prior Publication Data

US 2006/0267846 A1   Nov. 30, 2006

(30) Foreign Application Priority Data

May 27, 2005   (TW) ............................... 94117592 A

(51) Int. Cl.
*H01Q 1/24* (2006.01)
(52) U.S. Cl. ...................................... 343/702
(58) Field of Classification Search ................ 343/702, 343/882, 715, 878, 880; 16/367
See application file for complete search history.

(56) References Cited

U.S. PATENT DOCUMENTS

| 5,644,320 | A  | * | 7/1997  | Rossi .......................... 343/702 |
| 6,215,445 | B1 | * | 4/2001  | Chang ......................... 343/702 |
| 6,309,911 | B2 | * | 10/2001 | Hyoudo et al. .............. 438/113 |
| 6,362,794 | B1 | * | 3/2002  | Yu .............................. 343/702 |
| 2005/0085273 | A1 | * | 4/2005 | Khalid et al. ............... 455/566 |
| 2005/0102798 | A1 | * | 5/2005 | Kato ........................... 16/366 |
| 2006/0230579 | A1 | * | 10/2006 | Ko et al. ...................... 16/330 |

* cited by examiner

*Primary Examiner*—Huedung Mancuso
(74) *Attorney, Agent, or Firm*—Harness, Dickey & Pierce, PLC

(57) ABSTRACT

A portable electronic device having a double axial antenna structure. The planar antenna used for receiving electromagnetic waves is connected to the portable electronic device capable of displaying images through a double axial connection element. In this structure, the electronic device is rotatably connected to the double axial connection element. The planar antenna is also rotatably connected to the double axial connection element, so that the planar antenna may rotate relative to the electronic device into double axial directions through the double axial connection element, as such adjusting the orientation of the planar antenna without moving the image display unit and the quality and intensity of the received electromagnetic waves.

9 Claims, 6 Drawing Sheets

DOUBLE AXIAL ANTENNA STRUCTURE OF PORTABLE ELECTRONIC DEVICE

CROSS-REFERENCE TO RELATED APPLICATIONS

This non-provisional application claims priority under 35 U.S.C. § 119(a) on Patent Application No(s). 094117592 filed in Taiwan, R.O.C. on May 27, 2005, the entire contents of which are hereby incorporated by reference.

FIELD OF THE INVENTION

The invention relates to an adjustable antenna of a portable electronic device, and more particularly, to a double axial adjustable antenna of a portable electronic device.

RELATED ART

Usually the most important concern about a portable wireless communication device, having an antenna, is the quality of the received signals. In the early stage of the portable wireless communication device, its antenna was fixedly secured onto the device and having no adjustable capability, so that user had to move the device around to find the appropriate location, angle, and direction to raise the quality and intensity of the received signal. However, with the rapid progress and development of the communication industry, such wireless electronic and communication devices are designed to serve as multi-media devices, having multi-media functions such as audio and video capabilities. In this situation, if the antenna attached to this device is not able to adjust its angle and direction freely, the user still has to move the device around to raise the quality and intensity of the received signal. This is quite inconvenient. Therefore, the research and development of an antenna of a wireless multimedia device, which can be adjusted freely to increase the quality of the received signal without having to move the device around, is one of the most urgent tasks in this field.

The adjustable antenna of the related art is disclosed in Taiwan Patent Gazette M249401. Please refer to FIGS. 1A and 1B. FIG. 1A is a schematic diagram of a double axial rotatable communication device according to the prior art. FIG. 1B is a schematic diagram of the exploded view of a double axial rotatable communication device according to the prior art. As shown in FIGS. 1A and 1B, the double axial rotatable communication device includes an interface device connector 120, a connection member 122, and a wireless communication member 138 made of an upper cover 121 and a lower cover 124. The wireless communication member 138 includes an antenna 128 and a wireless communication module 126.

In addition, the antenna 128 is connected to the wireless communication module 126, and is capable of protruding outside of the shell box made of the upper cover 121 and lower cover 124. Alternatively, the antenna 128 can be inserted and received in the shell box as an embedded antenna. Moreover, one end of the interface device connector 120 is a male connection port 130, and the other end of the interface device connector 120 is a related signal wire sleeve shell 132 so as to enable a signal wire (not shown) to be passed through. The interface device connector 120 is rotatably connected to the connection member 122 along the X-axis, and the wireless connection member 138 is rotatably connected to the connection member 122 along the Y-axis. The connection member 122 includes a first portion 134 and a second portion 136. The interface device connector 120 is rotatably connected to the first portion 134 along the X-axis, and the wireless communication member 138 is connected to the second portion 136. Besides, the first portion 134 is pivotally connected to the second portion 136, and the second portion 136 and the first portion 134 can rotate around each other along the Y-axis perpendicular to the X-axis. In other words, the wireless communication member 138 is able to rotate relative to the first portion 134 with the Y-axis as the rotation axis. The second portion 136 is a horseshoe-shaped element, and the lower cover 124 is provided with a protrusion portion corresponding to the second portion 136, so that the second portion 136 can snap into the inside portion of the wireless communication member 138. The first portion 134 is provided with a number of pivot-connection elements and is sleeved onto the sleeve shell 132 of the interface device connector 120 through an opening 1341. The sleeve shell 132 is provided with a snap hook and is snapped onto the opening 1341 to prevent the sleeve shell 132 from detaching from the opening 1341. Furthermore, the signal wire of the interface device connector 120 is connected to the wireless communication module 126 through the connection member 122.

Although the structure of the adjustable antenna of the prior art is disclosed above, which is applied on a wireless communication module, this wireless communication module is connected to the other part of equipment outside the wireless communication module through a communication interface. This sort of arrangement of the prior art is quite different from that of the invention, as will be explained in detail later in the following descriptions. Furthermore, the signal wire of the interface device connector 120 is connected to the wireless communication module 126 through the connection member 122. As such, the connection wire is connected to the wireless communication module 126 through bypassing the second portion 136, so that the connection wire is connected to the wireless communication module 126, not through the rotation axis, of which the first portion is 134 pivotally installed onto the second portion 136. Consequently, the interface device connector 120 of this structure is not able to rotate into the position parallel to the wireless communication module 126. Therefore, in applying the above-mentioned antenna on the wireless communication device, the two major constituting members of the double axial rotation structure can not be adjusted into a mutual parallel position, so that the purpose of reducing the storage space can not be achieved, thus there is still much room for improvement.

SUMMARY OF THE INVENTION

In view of the above-mentioned problems and shortcomings of the prior art, the object of the invention is to provide a portable electronic device having a double axial antenna structure, in which the angle of the antenna can be adjusted to raise the quality and intensity of the received signal.

The portable electronic device having a double axial antenna structure includes an electronic device having a main body, an operation unit, and an image display unit, a planar antenna for receiving an electromagnetic waves and generating an electronic signal, and a double axial connection element rotatably connected to the electronic device. The main body is used to accommodate the operation unit and the image display unit, and the image display unit is used to receive the output signal of the operation unit and display an image thereon. In addition, the planar antenna is also rotatably connected to the double axial connection element so that the planar antenna can rotate in double axial directions relative to the electronic device through the double axial connection element, so as to adjust the quality and intensity of the received signal.

In the above-mentioned structure, the double axial connection element includes a revolving shaft and a rotation axis element. The first rotation axis includes a first end and a second end, which may rotate relative to the first end. The first end is fixed onto the electronic device, so that the second end may rotate relative to the electronic device. The rotation axis element includes a rotation seat and a connection plate. The rotation seat can rotate relative to the connection plate, and the second end of the revolving shaft is fixed onto one end of the rotation seat and rotates in cooperation. In addition, the planar antenna is fixed onto the connection plate, so that the planar antenna can rotate relative to the rotation axis element. As such, the planar antenna can rotate and adjust relative to the electronic device, into double axial directions.

Moreover, a protrusion block is provided on the end surface of the second end of the revolving shaft, and a recess slot is provided on one end of the rotation seat. The protrusion block is inserted onto the recess slot, so that the second end is fixed onto one end of the rotation seat and rotates in cooperation. As such, it can be inferred that the end surface of the second end is provided with a protrusion block of a specific shape, and a recess slot, matching the shape of the protrusion block is provided on one end of the rotation seat, so that the protrusion block can be inserted into the recess slot and move in cooperation.

In order to make the rotation of the rotation seat more stable, the rotation seat is connected and installed onto the main body by making use of an axial sleeve, so that one end of the rotation seat is pivotally connected to the axis sleeve, and in cooperation with the second end of the revolving shaft pivotally connected to the other end of the rotation seat. Thus the two ends of the rotation seat rotate stably together, with the axial sleeve and the second end of the revolving shaft on either end, relative to the same axis. According to the above description, the invention has the following advantages that the invention provides the capability of adjusting the planar antenna of the electronic device into double axial directions so as to raise the quality and intensity of the received signal. Thus, a user adjusts the planar antenna of the electronic device without the inconvenience of the prior art.

According to the above description, the invention has the following advantages that the invention provides the capability of adjusting the antenna of the electronic device into double axial directions so as to raise the quality and intensity of the received signal. Thus, a user adjusts the antenna of the electronic device without the inconvenience of the prior art.

Further scope of the applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given below, which is for illustration only and thus is not limitative of the invention.

DETAILED DESCRIPTION OF THE INVENTION

The purpose, construction, features, and functions of the invention can be appreciated and understood more thoroughly through the following detailed description with reference to the attached drawings.

Figure 1A:
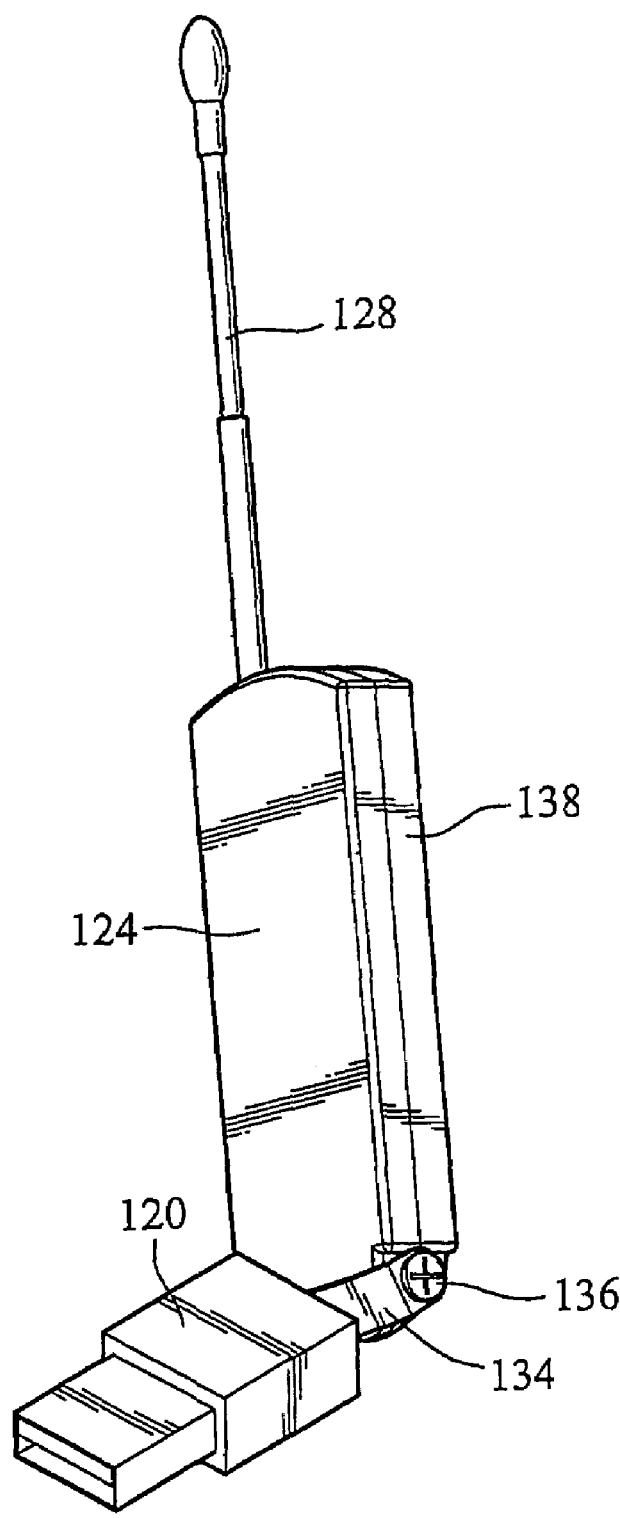
FIG. 1A is a schematic diagram of a double axial rotatable communication device according to the prior art.
Figure 1B:
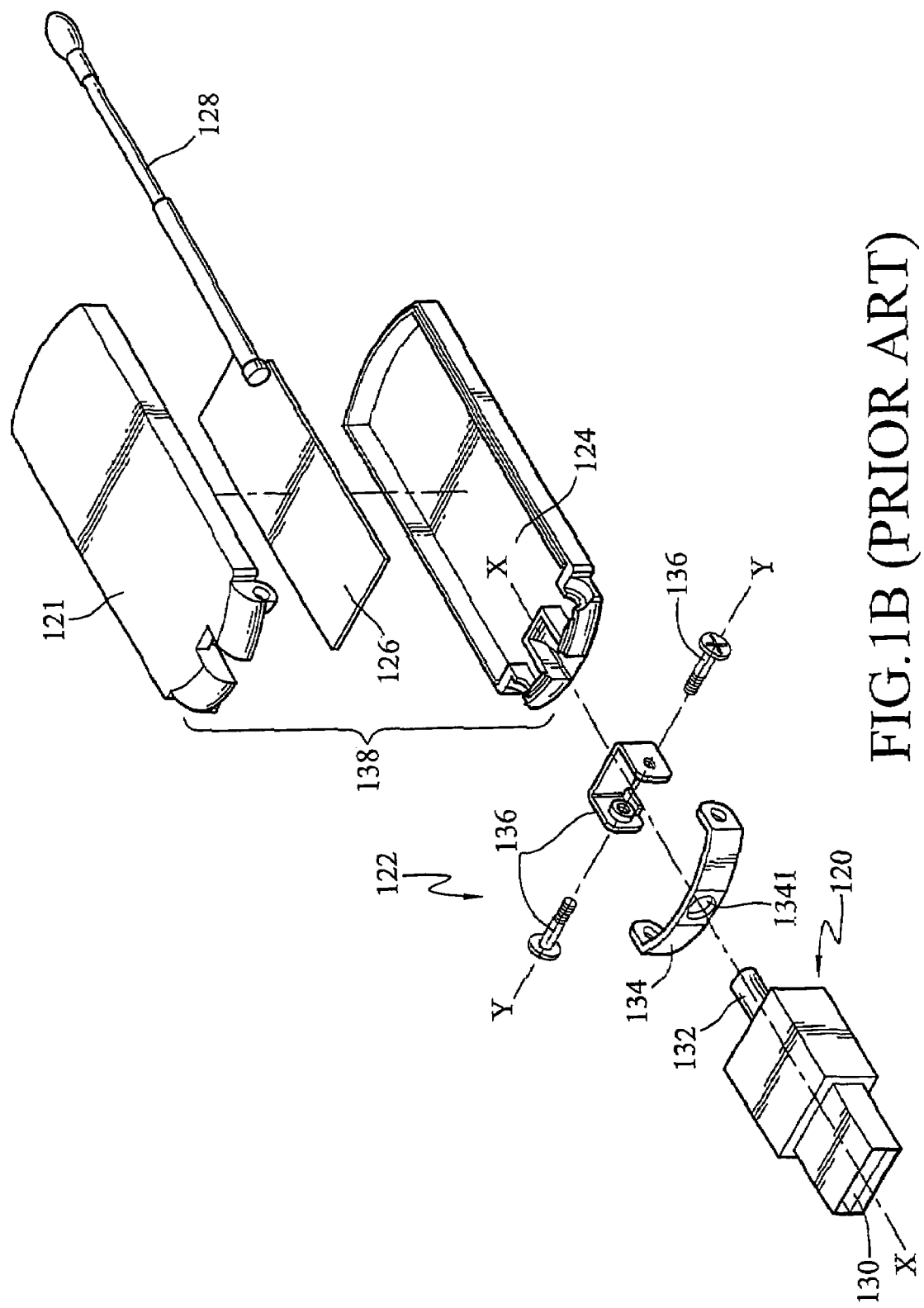
FIG. 1B is a schematic diagram of the exploded view of a double axial rotatable communication device according to the prior art.
Figure 2:
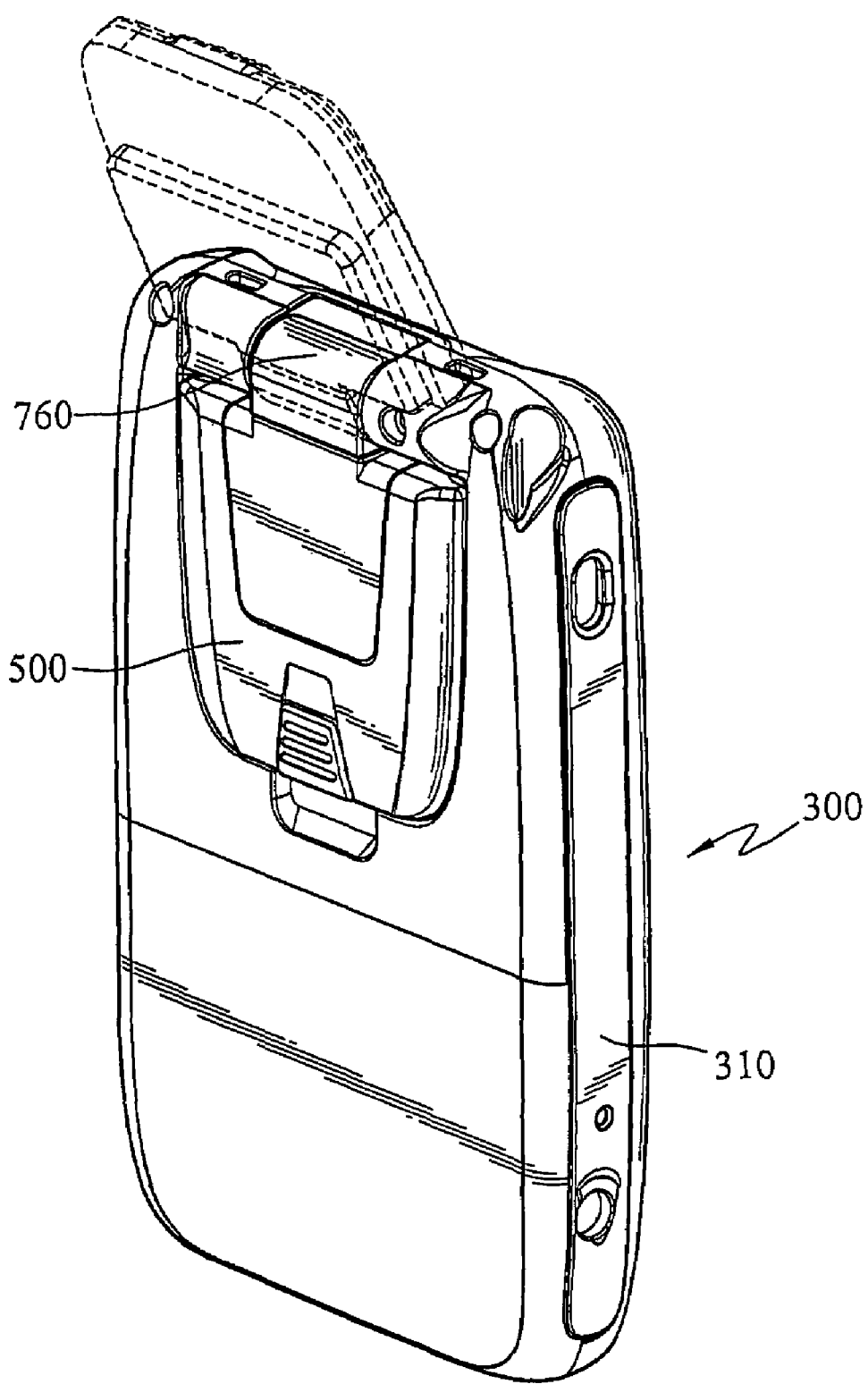
FIG. 2 is a schematic diagram of a double axial rotatable communication device according to an embodiment of the invention.

The invention provides a portable electronic device having a double axial adjustable antenna. Please refer to FIG. 2. FIG. 2 is a schematic diagram of a double axial rotatable communication device according to the embodiment of the invention. As shown in FIG. 2, the double axial rotatable communication device includes an electronic device 300, a planar antenna 500, and a double axial connection element 700. The double axial connection element 700 is rotatably connected to the electronic device 300, and the planar antenna 500 is also rotatably connected to the double axial connection element 700, 50 that the planar antenna 500 can rotate relative to the electronic device 300 into double axial directions through the double axial connection element 700, to adjust the quality and intensity of the received signal without moving the image display unit 320.

Figure 3:
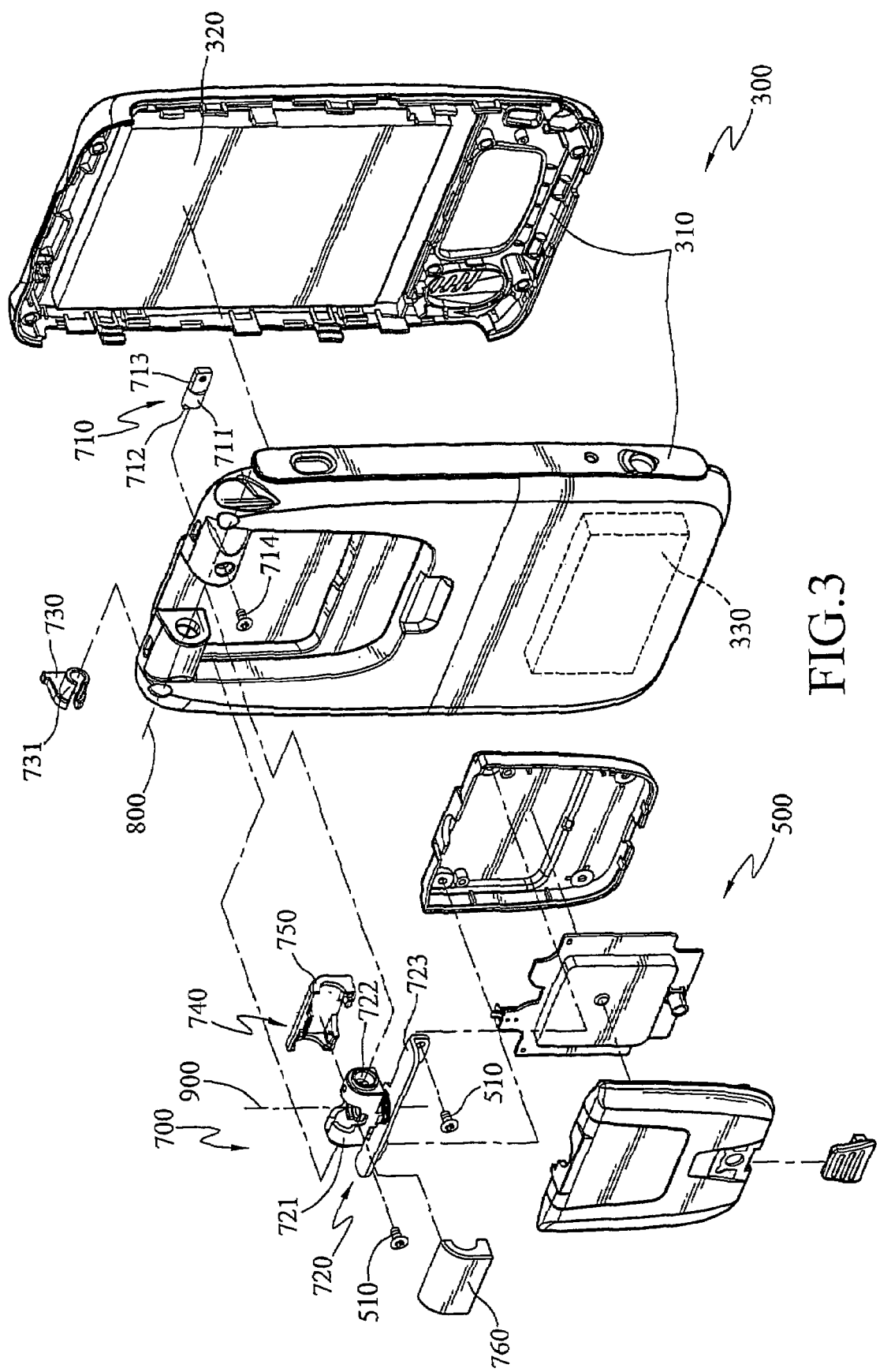
FIG. 3 is a schematic diagram of the exploded view of a double axial rotatable communication device according to the embodiment of the invention.
Figure 4:
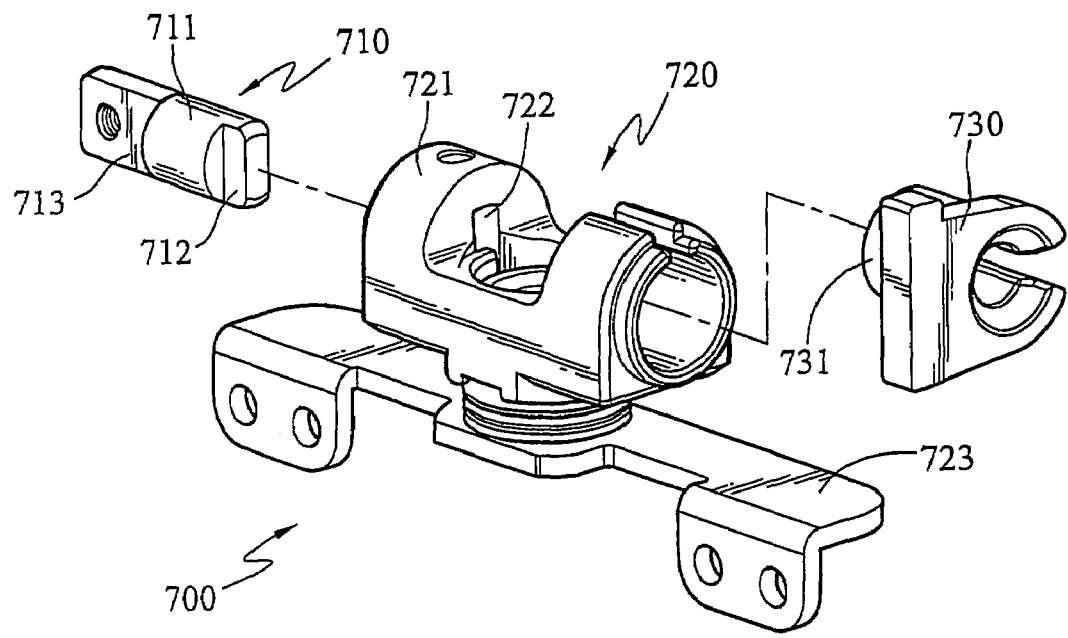
FIG. 4 is a schematic diagram of the exploded view of a double axial connection element according to the embodiment of the invention.

Please refer to FIGS. 3 and 4. FIG. 3 is a schematic diagram of the exploded view of a double axial rotatable communication device according to the embodiment of the invention. FIG. 4 is a schematic diagram of the exploded view of the double axial connection element according to the embodiment of the invention. As shown in FIG. 3, the double axial rotatable communication device includes an electronic device 300 having a main body 310, an operation unit 330, and an image display unit 320. The main body 310 is used to accommodate the operation unit 330 and the image display unit 320. The operation unit 330 is capable of performing the calculations required, and is provided with software and hardware to achieve the specific calculation functions. The image display unit 320 is used to receive the video signal from the operation unit 330 and display the related image on the image display unit 320, as such facilitating the user to understand and manipulate the message given by the operation unit 330. The planar antenna 500, which is an indispensable element used for receiving and transmitting the electromagnetic waves, the varieties of the antennas are enormous, and are used for different frequencies, different applications, different occasions, and different conditions depending on actual requirements. Upon receiving the electromagnetic waves, the planar antenna 500 is used to convert it into a signal of specific current/voltage and transmit to the connected equipment for subsequent signal conversion, processing, and application. Thus, when the electromagnetic wave is received by the planar antenna 500, it is converted to the electronic signal and transmitted to the electronic device 300 connected to it, then it is processed by the operation unit 330 of the electronic device 300 and displayed on the image display unit 320.

Among the numerous factors that affect the quality and intensity of the signal received by the planar antenna 500, the most important one is the relative orientation of the antenna relative to the electromagnetic waves, and this relative orientation may be varied depending on actual requirements. Furthermore, when the planar antenna 500 is attached to, or embedded in, a portable electronic device, the relative orientation of the antenna to the electromagnetic waves is varied constantly, so that the orientation of the planar antenna 500 must also change constantly, to raise the quality and intensity of the received signal. Especially when making use of the image display functions of the electronic device, the quality of the received signal is directly affected by the orientation of the planar antenna 500. Thus, if the orientation of the planar antenna 500 can not be adjusted according to the viewing position, then the quality of the received signal will be adversely affected. Therefore, in order to solve this problem, a double axial connection element 700 is connected between the planar antenna 500 and the electronic device 300 as a means for adjusting the orientation of the planar antenna 500, 50 that the orientation of the planar antenna 500 may be adjusted into double axial directions to achieve the best signal reception.

As shown in FIGS. 3 and 4, the double axial connection element 700 includes a revolving shaft 710 and a rotation axis element 720. The two ends of the revolving shaft 710 are a first end 711 and a second end 713 respectively, and the first end 711 can rotate relative the second end 713. The rotation axis element 720 has a rotation seat 721 and a connection plate 723, the rotation seat 721 is pivotally connected to the connection plate 723, thus the rotation seat 721 can rotate relative to the connection plate 723.

Since the revolving shaft 710 and the rotation axis element 720 are both single axial rotation elements, as such the rotation direction of the revolving shaft 710 is referred to as a first rotation axis 800 which is substantially parallel to a surface of the electronic device 300. The rotation direction of the rotation axis element 720 is referred to as the second rotation axis 900. Thus if the two elements are connected to each other perpendicularly along their respective rotation axes, namely, the first rotation axis 800 and the second rotation axis 900 are perpendicular to each other, then the double axial rotation function can be achieved.

Furthermore, the end surface of the first end 711 has a bar shaped protrusion block 712, and a bar shaped recess slot 722 is formed on one end of the rotation seat 721 perpendicular to the second rotation axis 900, so that the bar shaped protrusion block 712 is inserted and secured into the bar shaped recess slot 722.

However, the shapes of the recess slot 722 and the protrusion block 712 are not restricted to the bar shape. Any shape of the recess slot 722 and the protrusion block 712 is acceptable as long as they can match and snap and secure each other. As such, the second end 713 of the revolving shaft 710 is snapped and secured into the rotation seat 721, the first end 711 may rotate along the first rotation axis direction 800, and the rotation seat 721 may rotate along the second rotation axis 900, thus achieving the structure and function of double axial rotation.

The double axial connection element 700 is the pivot of rotation between the planar antenna 500 and the electronic device 300, thus it is connected to one end of the planar antenna 500 and the electronic device 300 respectively, and its connection structure is described as follows.

In the above-mentioned structure, the planar antenna 500 is fixed and secured onto the connection plate 723 by means of fixing the screw bolt 714 through the connection plate 723 of the rotation axis element 720, so that the planar antenna 500 can rotate relative to the rotation seat 721 along the second rotation axis 900. The first end 711 of the revolving shaft 710 is inserted through and installed into the main body 310 of the electronic device 300, and is fixed and secured to it by making use of the fixing screw bolt 510. Likewise, the second end 713 of the revolving shaft 710 rotates around the first rotation axis 800, and the second end 713 is snapped and secured to the rotation seat 721 of the rotation axis element 720. From the above description it is known that the rotation seat 721 and the connection plate 723 are rotated around the second rotation axis 900, and the planar antenna 500 is fixed and secured to the connection plate 723. Thus the planar antenna 500 can be rotated into double axial directions relative to the electronic device 300.

Figure 5:
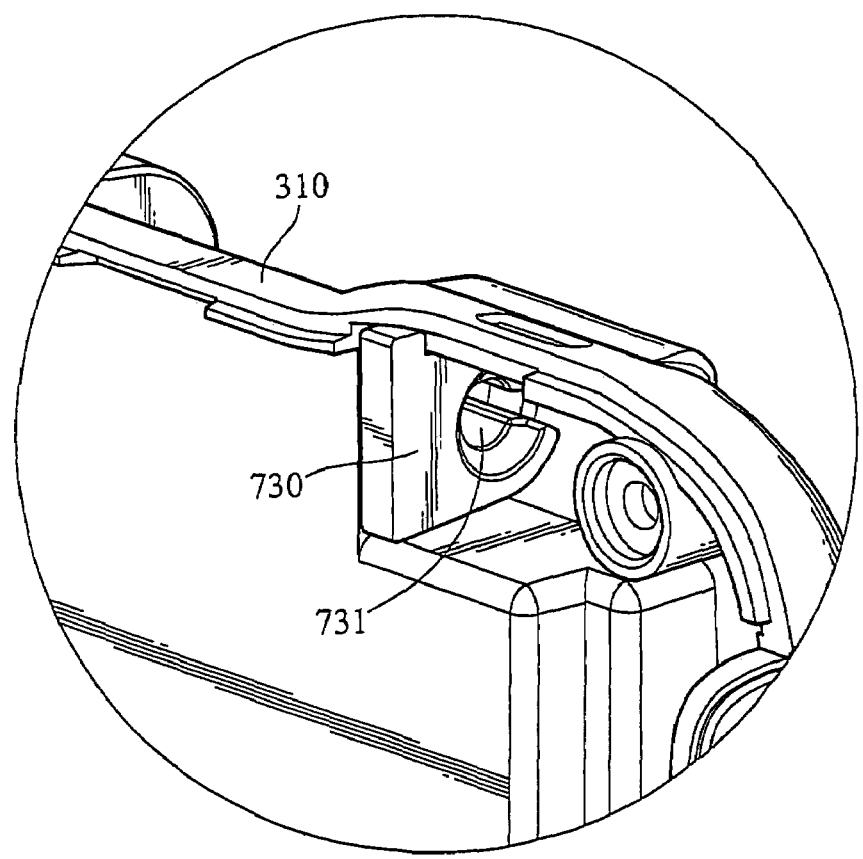
FIG. 5 is a schematic diagram of fixing the axial sleeve onto the electronic device according to the embodiment of the invention.

Please refer to FIGS. 3 and 5. FIG. 5 is a schematic diagram of fixing the axis sleeve onto the electronic device according to the embodiment of the invention. As shown in FIGS. 3 and 5, the double axial connection element 700 is rotated by making use of the pivot connection of the first end 711 and the second end 713 of the revolving shaft 710, which is the rotation around the rotation axis on one side of the double axial connection element 700. As such, the rotation of the planar antenna 500 relative to the electronic device 300 through the double axial connection element 700 may not be very stable. Therefore, according to the design of the invention, an axial sleeve 730 is provided with a supporting axle 731 and is inserted through into the main body 310 of the electronic device 300, to be pivotally connected to the other end of the rotation seat 721 of the rotation axis element 720, as such providing the rotation axis on the other side of the double axial connection element 700, so that the rotation of the planar antenna 500 relative to the electronic device 300 can be made fairly stable. The axial sleeve 730 is made through an ejection-to-mode process, and it can be made of engineering plastic selected from a group, consisting of polyethylene (PE), propylene (PP), nylon (MC), polyoxymethylene (POM), polyurethane (PU), ABS resin and polyvinyl chloride (PVC) and the like.

Please refer to FIG. 3 again. A rotation axial cover 740 is provided to enclose the rotation seat 721 to improve the appearance of the double axial antenna structure and prevent outside foreign objects from intruding near the double axial connection element 700 and obstructing its rotation. The rotation axial cover 740 includes a first cover 750 and a second cover 760, which are symmetric in shape and can be snapped to each other to enclose the rotation seat 721, to decorate the rotation seat 721 and prevent outside objects from getting close to the double axial connection element 700 and obstructing its rotation. Moreover, in real practice, the rotation axial cover 740 does not shield the connection space between the rotation seat 721 and the second end 713 of the rotation axis element 720, the connection space between the rotation seat 721 and the axial sleeve 730, to prevent obstruction of the connection and rotation of the above-mentioned elements.

Figure 6:
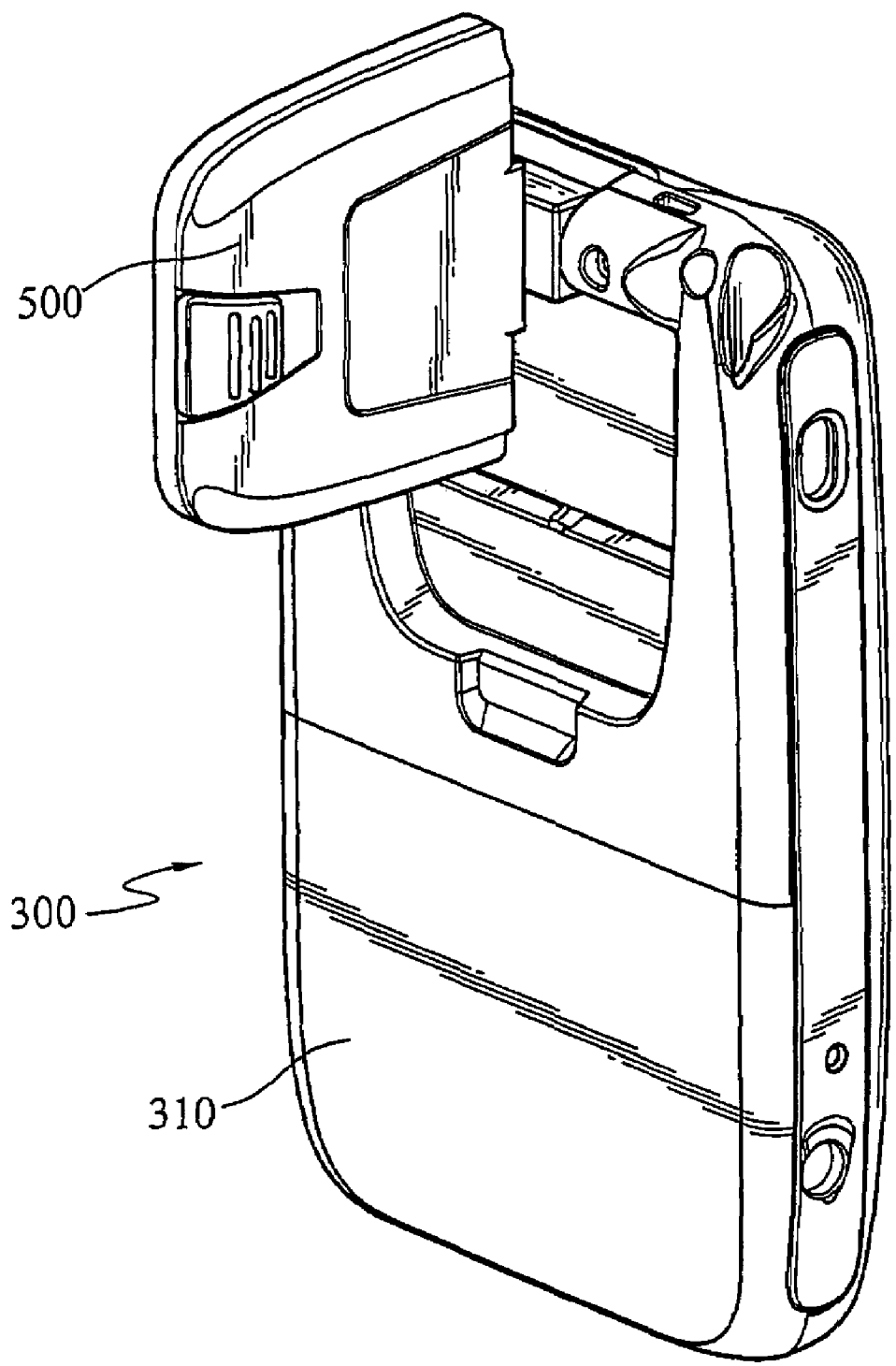
FIG. 6 is a schematic diagram of a double axial rotatable communication device in use according to the embodiment of the invention.

Please refer to FIGS. 2 and 6. FIG. 6 is a schematic diagram of a double axial rotatable communication device in use according to the embodiment of the invention. As shown in FIGS. 2 and 6, the orientation of the planar antenna 500 can be adjusted to raise the quality of the received signal through the rotation and operation of the double axial connection element 700 connected to the planar antenna 500 and the electronic device 300. When the electronic device 300 is utilized in upright position, as shown in FIG. 2, the planar antenna 500 may be rotated around the first rotation axis 800 to achieve a fairly good signal reception. Alternatively, when the electronic device 300 is utilized in horizontal position, the planar antenna 500 must be rotated around the second rotation axis 900 to achieve better signal reception results, as shown in FIG. 6. Since the portable electronic device 300 may be moved around to different places, the orientation of the planar antenna 500 must be able to be adjusted freely in double axial directions to raise the quality of the received signal and achieve better signal reception results, to expand the scope of utilization of the double axial rotatable antenna structure of the portable electronic device.

Knowing the invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A portable electronic device having a double axial antenna structure, comprising:
    an electronic device having a main body, an operation unit and an image display unit, wherein the main body is used to accommodate the operation unit and the image display unit, and the image display unit is used to receive an electronic signal from the operation unit and display an image thereon; and
    a planar antenna, connected to the electronic device by a double axial connection element, for receiving an electromagnetic wave from the operation unit to generate the electronic signal, and said double axial connection element including:
    a rotation seat;
    a connection plate, pivotally-coupled to the planar antenna, and coupled to a substantially middle portion of the rotation seat by a pivot;
    a revolving shaft, having a first end and a second end, which rotate relative to each other, wherein the first end is fixed onto the electronic device and the second end connects to one end of the rotation seat; and
    an axial sleeve on the main body and connected to another end of the rotation seat by a pivot;
        wherein by the revolving shaft, the planar antenna is able to rotate about a first rotation axis, which is substantially parallel to a surface of the electronic device; and by the connection plate and the rotation seat, the planar antenna rotates about a second rotation axis, which is perpendicular to the first rotation axis; and
        wherein the planar antenna is rotatable about the first and the second rotation axis to adjust the quality and intensity of the received electromagnetic wave without moving the image display unit.

2. The double axial antenna structure of a portable electronic device as claimed in claim 1, further comprising a fixing screw bolt for being inserted through the main body and fixed onto the first end, so as to fix the revolving shaft onto the main body.

3. The double axial antenna structure of a portable electronic device as claimed in claim 1, further comprising a screw bolt for being inserted through the connection plate and is fixed and secured onto the planar antenna.

4. The double axial antenna structure of a portable electronic device as claimed in claim 1, wherein a recess slot is formed in one end of the rotation seat, and a protrusion block is disposed in an end surface of the second end for being inserted into the recess slot, so that the second end is fixed onto one end of the rotation seat and moves in cooperation.

5. The double axial antenna structure of a portable electronic device as claimed in claim 4, wherein the protrusion block is a bar shaped protrusion block, and the recess slot is a bar shaped recess slot, the protrusion block is inserted into the recess slot and moves in cooperation.

6. The double axial antenna structure of a portable electronic device as claimed in claim 4, wherein the shape of the protrusion block matches that of the recess slot, so that the protrusion block can be inserted into the recess slot and moves in cooperation.

7. The double axial antenna structure of a portable electronic device as claimed in claim 1, wherein the axial sleeve is made of the material selected from a group consisting of polyethylene (PE), propylene (PP), nylon (MC), polyoxymethylene (POM), polyurethane (PU), ABS resin and polyvinyl chloride (PVC).

8. The double axial antenna structure of a portable electronic device as claimed in claim 1, further comprising a rotation axial cover for enclosing and protecting the rotation seat.

9. The double axial antenna structure of a portable electronic device as claimed in claim 8, wherein the rotation axial cover comprises a first cover and a second cover, the first cover is snapped into the second cover thus to enclose the rotation seat.

* * * * *